Patented Apr. 29, 1924.

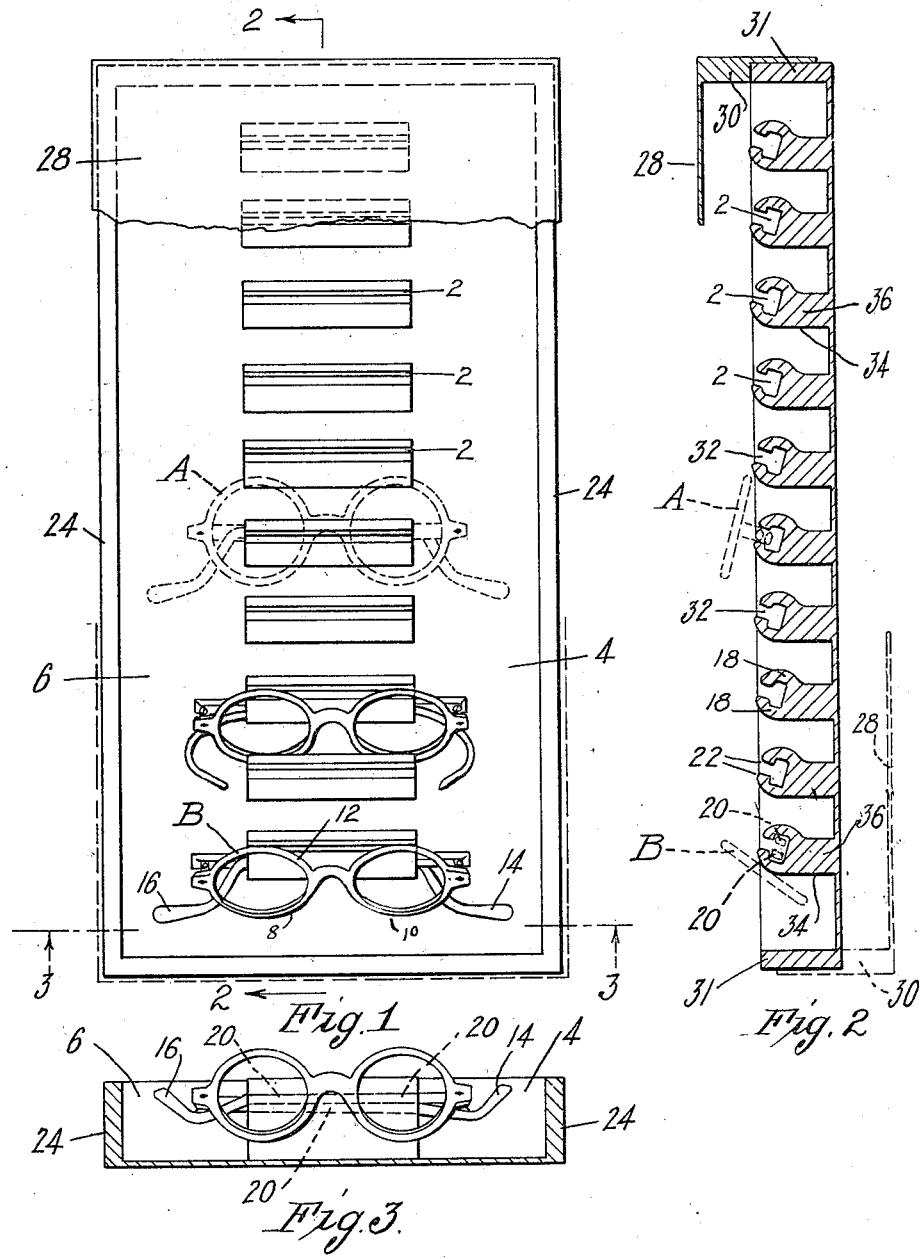

1,492,113

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

DISPLAY DEVICE.

Application filed November 30, 1923. Serial No. 677,604.

*To all whom it may concern:*

Be it known that I, JAMES WILSON WELSH, a citizen of the United States, and a resident of Providence, in the county of Providence and State of Rhode Island, have invented a new and useful Improvement in Display Devices, of which the following is a specification.

The present invention relates to display devices, and more particularly to devices for displaying ophthalmic mountings.

The chief object of the invention is to provide a device that is particularly adapted to display an assortment of spectacles. Other objects will be described hereinafter. With these ends in view, the invention consists of the device a preferred embodiment of which is hereinafter described, illustrated in the accompanying drawings, and defined in the appended claims.

In the accompanying drawings, Fig. 1 is a plan of a device constructed according to a preferred embodiment of the present invention, showing several spectacles in position; and Figs. 2 and 3 are sections taken upon the lines 2—2 and 3—3, respectively, of Fig. 1, looking in the directions of the arrows.

The improved device of the present invention is an improvement upon the device constituting the subject matter of a copending application, Serial No. 565,811, filed June 5, 1922 which matured January 1, 1924, into Patent No. 1,479,632. In both devices, a plurality of open-ended pockets 2 are longitudinally adjacently disposed centrally of the device, as shown more particularly in Figs. 1 and 3. The width of each pocket is less than the width of the device as a whole, to provide spaces 4 and 6 on each side of the pockets. In the device of the said patent, the pockets 2 are each adapted to receive portions 8 and 10 of the rims 12 and portions 20 of the temples of a folded pair of spectacles, and the spaces 4 and 6 are adapted to receive the ends 14 and 16, respectively, of the temples of the folded spectacles. According to the present invention, the pockets are of dimensions such as to receive and hold snugly the portions 20 of the temples only. To this end, the cross-dimension of the pockets should not be greatly in excess of double the thickness of a temple. The spectacles illustrated are what are commonly known as of the non-metallic, or "all-shell" type, which it is not possible to adjust to the facial characteristics of the individual wearer. Several different forms of this type of temple are illustrated in the drawings. A display device of this character is adapted to hold a plurality of spectacles of this type, of different sizes and shapes, each adapted to the needs of a different class of wearers.

The pockets are shown constituted between adjacent walls 18, hook-shaped in cross section, with the hooks 22 oppositely disposed to each other, so as to engage around, and hold in place, the portions 20 of the temples, as shown more particularly in Fig. 2, to cause the spectacles to be retained securely in place.

The opening 32 between the oppositely disposed hooks 22 of each pocket is made a little bigger than the thickness of the portion 20 of a temple, but considerably smaller than double the temple thickness. It is thus a simple matter to insert the portions 20 of the two temples into the pocket, in the manner illustrated by the spectacles A, Figs. 1 and 2, one temple after the other. The spectacles are then turned from the more or less horizontal position indicated as occupied by the folded spectacles A to the tilted position indicated by the folded spectacles B. The hooks 22 now engage, one along and against each of the temples of the folded spectacles, holding the spectacles firmly in place, and preventing distortion or bending of the temples. The rims 12 are maintained against a face 34 of the upright 36 upon which the hooks 22 are carried, between adjacent uprights 36, and outside of the pockets 2. The spectacles are thus held very securely in place, without danger of accidental loosening. To remove the spectacles, it is necessary to turn the spectacles once more, from the position indicated as occupied by the spectacles B, into the position indicated as occupied by the spectacles A. The two temples may now be successively lifted out of the opening 2 to remove the spectacles.

As in the above-described application, the device as a whole is mounted in a box, the spaces 4 and 6 being provided between the pockets 2 and the side walls 24 of the box. The uprights 36 are shown integrally connected together, so that they may be assembled as a unit in the box. The usual layers of padding and the like, and a covering of felt may be provided to give the box an attractive appearance. A cover 28 closes the box when not in use. The cover is provided with lugs 30 adapted to contact with the end walls 31 of the box, as shown in full lines in Fig. 2. The position of the cover may be reversed for display purposes, as indicated by dotted lines in Figs. 1 and 2.

The display device of the present invention is obviously subject to considerable modification and change without departing in any way from the spirit and scope of the invention. All such changes and modifications are intended to be embraced within the appended claims.

What is claimed as new is:

1. A device of the class described adapted to hold folded spectacles having, in combination, a pocket having walls, the width of the pocket being such that portions of the temples of the folded spectacles may be received between the walls, and spaces on both sides of the pocket, the spaces being large enough to receive the ends of the temples of the folded spectacles, the cross dimension of the pocket being a little in excess of double the thickness of a temple, whereby the temples are adapted to be held snugly in the pocket.

2. A device of the class described adapted to hold folded spectacles having, in combination, a pocket having hook-shaped walls, the width of the pocket being such that portions of the temples of the folded spectacles may be received between the walls, and spaces on both sides of the pocket, the spaces being large enough to receive the ends of the temples of the folded spectacles, the cross dimension of the pocket being a little in excess of double the thickness of the temple, whereby the temples are adapted to be held snugly in the pocket, and the hooks being adapted to retain the temples in the pocket.

3. A device of the class described adapted to hold folded spectacles having, in combination, a base having walls to constitute a pocket, the walls being of less width than the width of the base and being disposed centrally of the base to provide spaces on both sides of the pocket, the pocket being adapted to receive portions of the temples of a folded pair of spectacles, and the spaces on both sides of the pocket being adapted to receive the ends of the temples of the folded spectacles, the cross dimension of the pocket being a little in excess of double the thickness of a temple, whereby the temples are adapted to be held snugly in the pocket.

4. A device of the class described adapted to hold folded spectacles having, in combination, a plurality of pockets longitudinally disposed centrally of the device, the pockets being less than the width of the device to provide a space on each side of the pockets, the width of the pockets being such that portions of the temples of the folded spectacles may be received between the walls, the spaces on both sides of the pocket being large enough to receive the ends of the temples of the folded spectacles, and the cross dimensions of the pockets being a little in excess of double the thickness of a temple, whereby the temples are adapted to be snugly held in the pocket.

5. A device of the class described adapted to hold folded spectacles having, in combination, a plurality of adjacently disposed pockets having hook-shaped walls and each adapted to receive portions of the temples of folded spectacles, and spaces on both sides of the pockets for receiving the ends of the temples, the cross dimensions of the pockets being a little in excess of double the thickness of a temple, whereby the temples are adapted to be snugly held in the pockets, and the hooks being adapted to retain the temples in the pockets.

6. A display box adapted to hold folded spectacles having, in combination, a plurality of walls longitudinally disposed centrally of the box to constitute pockets between adjacent walls, the walls being less than the width of the box to provide a space on each side of the pockets between the pockets and the sides of the box, the pockets being each adapted to receive portions of the temples of a pair of folded spectacles, and the spaces on both sides of the pockets being adapted to receive the ends of the temples, the cross dimensions of the pockets being a little in excess of double the thickness of the temple, whereby the temples are adapted to be snugly held in the pockets, and the walls being hook-shaped, with the hooks oppositely disposed to engage the said portions of the temples to cause the spectacles to be retained in the pockets.

In testimony whereof, I have hereunto subscribed my name this 23d day of November, 1923.

JAMES W. WELSH.